United States Patent [19]

Kuchuk-Yatsenko et al.

[11] Patent Number: 4,490,081
[45] Date of Patent: Dec. 25, 1984

[54] ARRANGEMENT FOR REMOVING BURRS IN BUTT RESISTANCE WELDING OF WORKPIECES

[75] Inventors: Sergei I. Kuchuk-Yatsenko; Valery G. Krivenko; Mikhail V. Bogorsky; Ivan L. Lazebny; Fedor K. Porkhun; Vasily A. Sakharnov; Vitaly T. Cherednichok, all of Kiev, U.S.S.R.

[73] Assignee: Institut Elektrosvarki Imeni E.O. Patona Akademit Nauk Ukrainskoi SSR, Kiev, U.S.S.R.

[21] Appl. No.: 368,056

[22] Filed: Apr. 13, 1982

[51] Int. Cl.³ ............................................... B23D 1/08
[52] U.S. Cl. .................................. 409/300; 29/33 A; 83/914; 409/310
[58] Field of Search ............... 409/300, 298, 310, 297; 29/33 A; 83/914; 51/178, 241 LG

[56] References Cited

U.S. PATENT DOCUMENTS

| 3,015,995 | 1/1962 | Fahy | 409/300 |
| 3,018,700 | 1/1962 | Cerwin et al. | 409/310 |
| 3,597,958 | 8/1971 | Gross | 409/300 X |
| 4,165,625 | 8/1979 | Wagner et al. | 409/298 X |
| 4,175,897 | 11/1979 | Kuchuk-Yatsenko et al. | 409/300 |
| 4,269,552 | 5/1981 | Unigovsky et al. | 409/300 X |
| 4,410,780 | 10/1983 | Mutti | 29/33 A |

Primary Examiner—Z. R. Bilinsky
Attorney, Agent, or Firm—Ladas & Parry

[57] ABSTRACT

The arrangement comprises a body constructed in the form of a grip clamp separable from the vertical axis of a workpiece, and having two jaws coupled with each other in the upper portion thereof by a clamping cylinder. The arrangement further comprises cutters for deburring, and a mechanism for pressing said cutters to the workpiece surface. The cutters are mounted in the lower portion of the jaws so that cutting edges thereof form a profile of the workpiece cross-section. The cuttes disposed on the same jaw are pivotally connected with each other. The mechanism for pressing the cutters is constructed in the form of a system of hydraulic cylinders mounted on the jaws in symmetrical relationship relative to the vertical axis of the body. Said hydraulic cylinders are provided with rods operatively connected to corresponding cutters.

3 Claims, 5 Drawing Figures

ARRANGEMENT FOR REMOVING BURRS IN BUTT RESISTANCE WELDING OF WORKPIECES

BACKGROUND OF THE INVENTION

1. Field of the Invention

The present invention relates to the design of welding equipment, and particularly to devices for removing burrs in butt resistance welding by machines of the grip type.

The invention may prove most advantageous for butt resistance welding of pipes when laying main pipelines.

Arrangements for removing burrs in butt resistance welding are known for a comparatively long time. However, no arrangement for removing burrs has been developed up to now which ensures high quality of deburring under conditions of an increased productivity of the welding process when treating workpieces of various profiles, and particularly in butt resistance welding of pipes.

2. Prior Art

Known in the art are arrangements for removing burrs from welded butts of rails, pipes, shaped steel articles etc. (U.S. Pat. Nos. 3,081,673, 3,336,839, French Pat. No. 1417444, Japanese Pat. Nos. 46-8568 and 45-29092). The above arrangements comprise a system of deburring cutters whose cutting edges form a profile of the workpiece cross-section. Said cutters are operatively connected to a mechanism for pressing the cutters to the workpiece surface and to a drive for shifting them along the workpiece.

However, such an arrangement is disposed separately from the welding machine and cuts off burrs which have already cooled down, whereby the process capacity is significantly decreased.

The above disadvantage is eliminated to a large extent with an arrangement for removing burrs in butt resistance welding of rails (USSR Author's Certificate No. 697275). The above arrangement is mounted on one of movable bodies of a welding machine of the grip type, said body being at the same time the body of the given device. The arrangement comprises a body separable from the vertical axis of a workpiece and constructed as a grip clamp provided with two jaws coupled with each other in the upper portion thereof by a clamping cylinder, a cross member being fixed on the rod thereof. In the lower portion of said jaws are mounted one upper cutter and two side cutters whose cutting edges form a profile of the rail cross-section. The two side cutters are mounted on pivots, which are rigidly secured on said jaws. Said cutters are disposed symmetrically relative to the vertical axis of the rail.

The arrangement is provided with a mechanism for pressing the cutters to the rail surface. Said mechanism is made as a stop fixed on the cross member, said stop being operatively coupled with the upper cutter, which in turn is pivotally connected to the side cutters.

The above described arrangement ensures removing burrs from the welded butt over the whole perimeter of the rail immediately after the termination of the welding process. However, the above arrangement provides for a high quality of deburring and an increased capacity only when processing rails. In the utilization of said arrangement in the process of welding pipes, boxshaped articles and channel bars, the variation of location of the cutters in accordance with the profile of said workpieces does not ensure high quality of deburring.

The above fact is explained by the occurrence of deformation of said articles in the course of clamping them the body of the welding machine. As a result, the cutting edges of the cutters do not embrace the workpiece tightly over the perimeter thereof, and thereby a required space between the cutting edges of the cutters and the surface of a workpiece to be processed is not ensured. A decrease in the quality of deburring in turn results in the reduction of the capacity of the welding process. This fact can be explained by the need in an additional treatment of the weld.

Moreover, in the process of deformation of the workpiece surface (in the course of clamping) the deformation forces are taken by the cutters and are transmitted to pivots rigidly fixed on the jaws. As a result, the reliability of operation of the device is significantly lowered due to a possible damage of the above pivots. Thus, the above described arrangement can be effectively used only in the welding of rails, thereby considerably limiting the scope of working thereof.

SUMMARY OF THE INVENTION

The main object of the invention is to expand the scope of working of the arrangement.

Another object of the invention is to ensure a high quality of deburring.

Still another object of the invention is to ensure a high capacity of the welding process.

A further object of the invention is to ensure the reliability of operation of the arrangement.

The objects set forth and other objects of the invention are attained by that in an arrangement for removing burrs in butt resistance welding of workpieces, comprising a body separable from the vertical axis of a workpiece, said body constructed as a grip clamp and having two jaws coupled with each other in the upper portion thereof by a clamping cylinder, and mounted in the lower portion of said jaws deburring cutters whose cutting edges form a profile of the workpiece cross-section, and a mechanism for pressing the cutters to the workpiece surface, according to the invention, the mechanism for pressing the cutters to the workpiece surface is constructed as a system of hydraulic cylinders mounted on said jaws in symmetrical relationship relative to the vertical axis of the grip clamp, the rods of said hydraulic cylinders being operatively connected to corresponding cutters, and the cutters mounted on the same jaw being pivotally connected with each other.

The invention consists in that an arrangement for removing burrs in butt resistance welding of workpieces comprises: a body made as a grip clamp separable from the vertical axis of a workpiece, said body being provided with two jaws; a clamping cylinder coupling said jaws in the upper portion thereof; deburring cutters mounted in the lower portion of the jaws so that cutting edges thereof form a profile of the workpiece cross-section, the cutters disposed on the same jaw being pivotally connected with each other; a mechanism for pressing the cutters to the workpiece surface, constructed as a system of hydraulic cylinders mounted on the jaws symmetrically relative to the vertical axis of the body and provided with rods operatively connected with corresponding cutters.

Such an embodiment of the mechanism for pressing the cutters allows the cutters to be pressed to the deformed surface of the workpiece over the regions with the smallest gap. The hydraulic cylinders take up considerable forces of the workpiece deformation during the operation of clamping this workpiece. Said advantages allow the given arrangement to be effectively used for deburring workpieces having various cross-section configurations, and especially such workpieces as pipes, boxshaped articles etc., thereby considerably expanding the scope of working of the above arrangement. The high quality of deburring and the process productivity are maintained, and the reliability of operation of the arrangement is ensured.

In the course of welding workpieces under stationary conditions (e.g. at the works, pipe-assemblying depots etc.) it is expedient that the mechanism for pressing the cutters to the workpiece surface be made as two hydraulic cylinders each of which is secured on a corresponding jaw, the rod of each hydraulic cylinder being rigidly coupled with a midpoint of a double-arm lever whose arms are pivotally connected to corresponding cutters.

Under such conditions, an increase in the overall dimensions of the welding machine does not influence the reliability of operation of the machine and convenient maintenance thereof, while the utilization of only two hydraulic cylinders considerably simplifies the arrangement.

When welding workpieces under field conditions when the overall dimensions of the welding machine are of great importance, it is expedient that the mechanism for pressing the cutters to the workpiece surface be constructed in the form of four hydraulic cylinders which are pivotally mounted in paris on each jaw, the rods of said cylinders being pivotally connected to the corresponding cutters, and the cutters of each pair of the hydraulic cylinders being pivotally connected with each other.

BRIEF DESCRIPTION OF DRAWINGS

The invention is further explained in terms of specific embodiments thereof with reference to the accompanying drawings, in which.

DETAILED DESCRIPTION OF THE INVENTION

Figure 1:
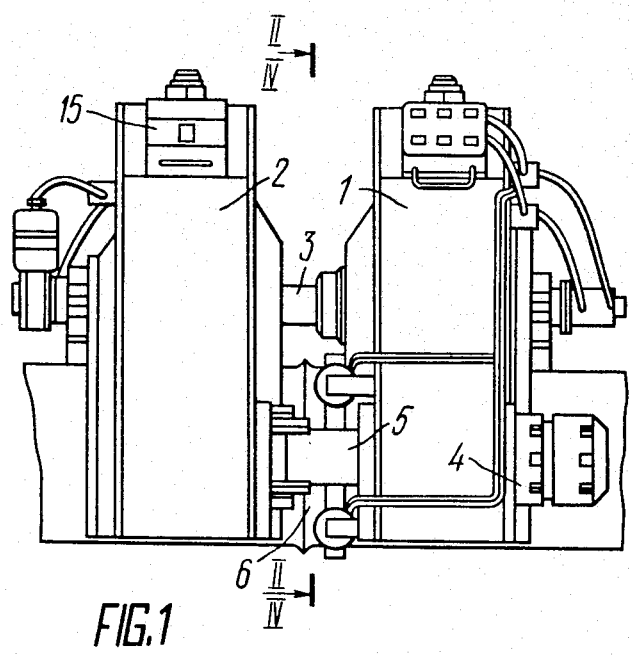
FIG. 1 is a general view of a grip-type welding machine provided with an arrangement for removing burrs according to the invention.

An arrangement for removing burrs in butt resistance welding is mounted on a movable body 1 (FIG. 1) of a grip-type welding machine, said body being in turn the body of the arrangement. The grip-type welding machine comprises two bodies 1 and 2 fixed on the same shaft 3. The body 2 is mounted on the shaft 3 so that it is immovable in the axial direction, while the body 1 is mounted on a sleeve (not shown) which in turn is mounted for the axial motion on the same shaft 3. Axial movement of the body 1 is accomplished by means of hydraulic cylinders 4 whose rods 5 couple both the bodies 1 and 2 of the machine.

Each of the bodies 1 and 2 of the welding machine is made as a grip clamp being separable along the vertical axis of a workpiece (e.g. a pipe 6) and being provided with two jaws 7 and 8 (FIGS. 2 and 3), said jaws coupled in the upper portion thereof by means of a clamping cylinder 9. On a rod 10 of the clamping cylinder 9 is secured a cross member 11 with connecting links 12 and 13 pivotally mounted thereon, said connecting links being in turn pivotally coupled with jaws 7 and 8 respectively.

Each of the jaws 7 and 8 is provided with a butt welding die 14 which in the given case has a cylindrical working surface with a radius equal to that of the workpiece, i.e. a pipe 6, to be welded.

In the jaws 7 and 8 of the body 2 (FIG. 1) are assembled welding transformers 15 electrically connected to the butt welding dies 14.

According to the invention, the arrangement further comprises cutters 16, 17, 18, and 19 (FIG. 2) for removing burrs, mounted in the lower portion of said jaws 7 and 8 of the body 1, and a mechanism 20 for pressing said cutters 16, 17, 18, and 19 to the surface of a workpiece, i.e. pipe 6.

The deburring cutters 16, 17, 18, and 19 are so mounted that their cutting edges form the profile of the cross-section of the pipe 6. The cutters 16 and 17, disposed on the jaw 7, and the cutters 18 and 19, disposed on the jaw 8, are pivotally connected with each other by means of pivots 21.

The mechanism 20 for pressing the cutters 16, 17, 18, and 19 to the surface of the pipe 6, according to the invention, is made as a system of hydraulic cylinders mounted on the jaws 7 and 8 symmetrically relative to the vertical axis of the body 1 and provided with rods operatively connected with corresponding cutters 16, 17, 18, and 19.

Figure 2:
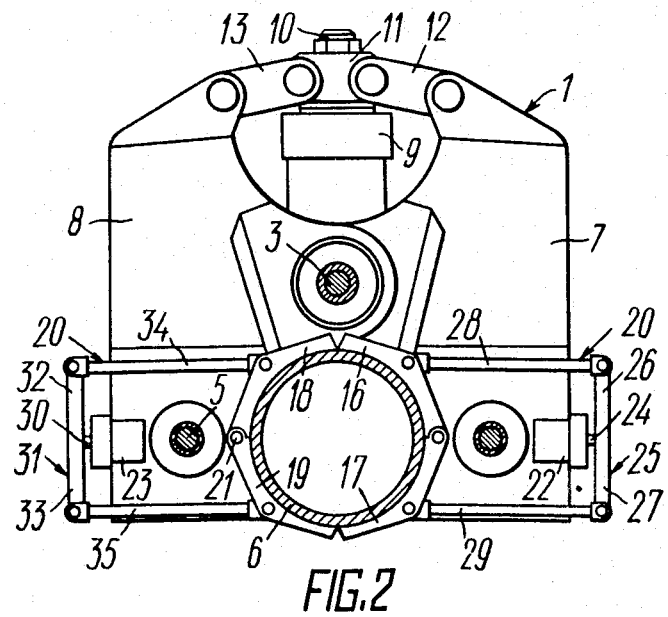
FIG. 2 is a modification of the claimed arrangement provided with two hydraulic cylinders and in a position when cutters squeeze a workpiece, a section taken along the line II—II in FIG. 1.
Figure 3:
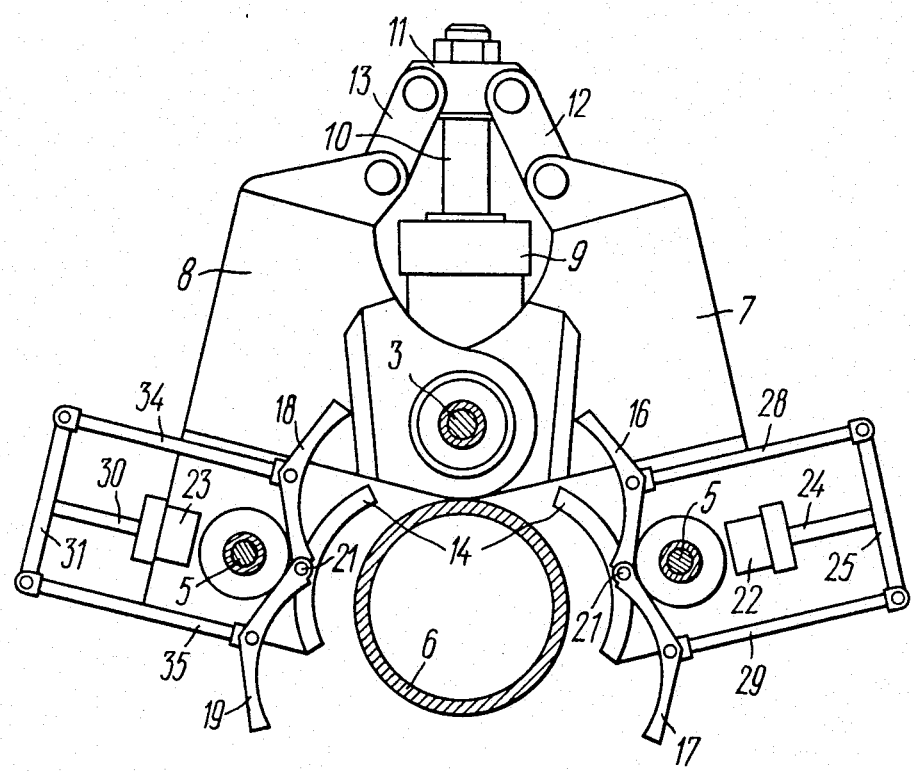
FIG. 3 shows a modification of the claimed arrangement illustrated in FIG. 2 and in a position when the jaws are released.

FIGS. 2 and 3 illustrate a modification of the claimed arrangement wherein the mechanism 20 for pressing the cutters 16, 17, 18, and 19 to the surface of the pipe 6 is constructed as two hydraulic cylinders 22 and 23. The hydraulic cylinder 22 is secured on the jaw 7 and has a rod 24 rigidly coupled with a midpoint of a double-arm lever 25. Arms 26 and 27 of the lever 25 are pivotally connected to the cutters 16 and 17 respectively by means of links 28 and 29 respectively.

The hydraulic cylinder 23 is fixed on the jaw 8 and is provided with a rod 30 rigidly coupled with a midpoint of a double-arm lever 31. Arms 32 and 33 of the lever 31 are pivotally connected to the respective cutters 18 and 19 by means of links 34 and 35 respectively.

In FIG. 2 the above described modification of the invention arrangement is illustrated in the position where the cutters 16, 17, 18, and 19 squeeze the pipe 6, and in FIG. 3 is shown a position where the jaws 7 and 8 and the cutters 16, 17, 18, and 19 respectively are released.

Figure 4:
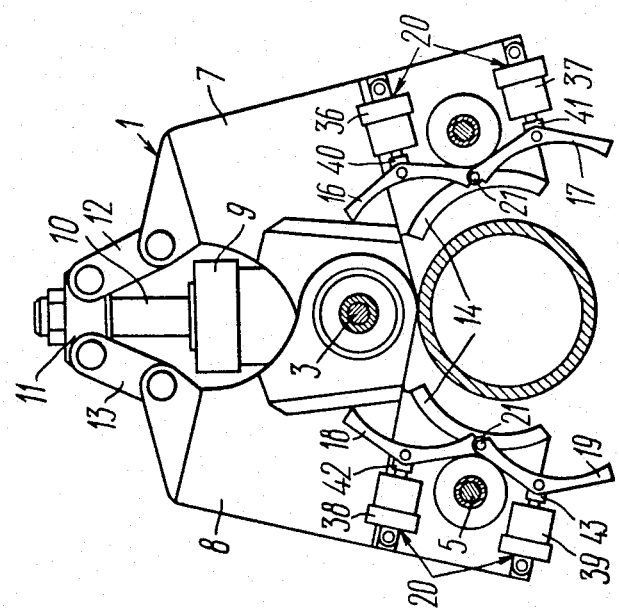
FIG. 4 illustrates a modification of the claimed arrangement provided with four hydraulic cylinders and in a position where cutters squeeze a workpiece, a section taken along the line IV—IV in FIG. 1.
Figure 5:
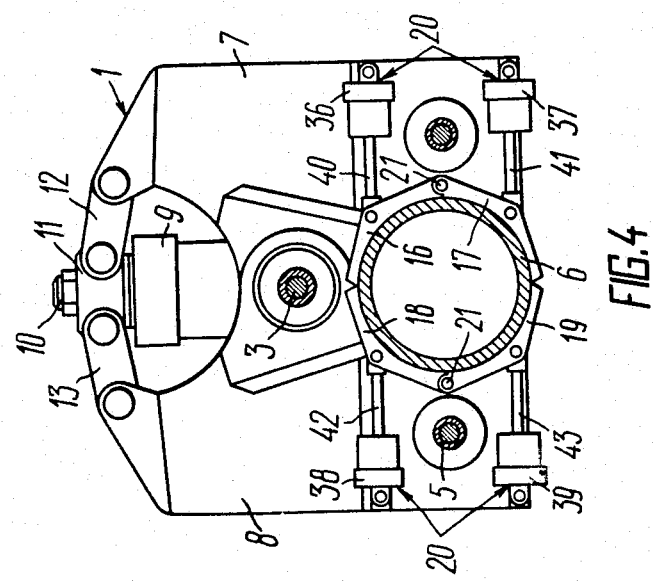
FIG. 5 shows a modification of the claimed arrangement illustrated in FIG. 4 and in a position where the jaws are released.

FIGS. 4 and 5 show a modification of the inventive arrangement wherein the mechanism 20 for pressing the cutters 16, 17, 18, and 19 to the surface of the pipe 6 is constructed as four hydraulic cylinders 36, 37, 38, and 39 mounted in pairs on the jaws 7 and 8. The hydraulic cylinders 36 and 37 are pivotally secured on the jaw 7 and are provided with rods 40 and 41 respectively which rods are perpendicular to the vertical axis of the body 1 and are pivotally coupled with the cutters 16 and 17 respectively which in turn are pivotally connected with each other by means of the pivot 21.

The hydraulic cylinders 38 and 39 are pivotally secured on the jaw 8 and are provided with rods 42 and 43 respectively which rods are perpendicular to the vertical axis of the body 1, are coaxial with the rods 40 and 41 respectively, and are pivotally coupled with the cutters 18 and 19 respectively which in turn are pivotally connected with each other by means of the pivot 21.

In FIG. 4 the above described modification of the inventive arrangement is shown in the position where the cutters 16, 17, 18, and 19 squeeze the pipe 6, and FIG. 5 illustrates the position where the jaws 7 and 8 and the cutters 16, 17, 18, and 19 respectively are released.

The above described arrangement for removing burrs operates as follows.

In the starting position, under the action of the clamping cylinder 9 the body 1 (grip clamp) is in the opened position like the body 2 (FIGS. 1, 3 and 5).

After the machine has been mounted on the pipe 6, the clamping cylinder 9 accomplishes the stroke for bringing together the jaws 7 and 8 (FIG. 2) of the body 1 (the same for the body 2). The rod 10 of the cylinder 9 together with the cross member 11 is lowered. The connecting links 12 and 13 are rotating closer to the horizontal position thereby removing the upper ends of the jaws 7 and 8 from the vertical axis of the body 1 and rotating said ends about the shaft 3. The lower ends of the jaws 7 and 8 are brought together thereby squeezing the pipe 6 to be welded within the butt welding dies 14. The cutters 16, 17, 18, and 19 are brought together along with the lower ends of the jaws 7 and 8.

Simultaneously with squeezing the pipe 6 by the dies 14, the rods 24 and 30 of the hydraulic cylinders 22 and 23 respectively start moving. Said rods 24 and 30 act on the cutters 16, 17, 18, and 19 through the double-arm levers 25 and 31, which cutters embrace the pipe 6 over the perimeter thereof in the course of rotation about the pivots 21.

After the completion of welding the pipes 6 the end of the welded pipe 6, clamped in the body 1, is released from the butt welding dies 14 by releasing the pressure within the clamping cylinder 9. The butt welding dies 14 do not unclamp completely and are withdrawn from the surface of the pipe 6 to the sides by a distance ensuring the possibility of sliding said dies 14 over the surface of the pipe 6.

Following this, the hydraulic cylinders 4 are actuated, and owing to an additional stroke of the rods 5 of said cylinders 4 the body 1 is fed in the direction of the body 2 of the machine. The cutters 16, 17, 18, and 19 remove burrs from the welded butt over the whole perimeter of the pipe 6.

Following the removal of burrs, the rods 24 and 30 of the hydraulic cylinders 22 and 23 start moving in the direction from the pipe 6, while rotating the cutters 16, 17, 18, and 19 about the pivots 21, which cutters are withdrawn from the surface of the pipe 6. (FIG. 3). At the same time, the release of the pipe 6 is initiated by means of the clamping cylinder 9 until the complete opening of the jaws 7 and 8. Following this, the welding machine is dismounted from the pipes 6.

The modification of the arrangement for removing burrs, illustrated in FIGS. 4 and 5, operates substantially in the same manner as described above.

However, simultaneously with clamping of the pipe 6 by the dies 14, the rods 40, 41, 42, and 43 of the hydraulic cylinders 36, 37, 38, and 39 respectively start moving. Said rods 40, 41, 42, and 43 act on the cutters 16, 17, 18, and 19 which cutters, in the course of rotation about the pivots 21, embrace the pipe over the perimeter thereof.

After the removal of burrs the rods 40, 41, 42, and 43 of the hydraulic cylinders 36, 37, 38, and 39 start shifting in the direction from the pipe 6, while rotating the cutters 16, 17, 18, and 19 about the pivots 21, which cutters are withdrawn from the surface of the pipe 6.

It is to be understood that only particular embodiments of the invention have been shown and described. Various modifications may be made in the invention without departing from the spirit and scope thereof as defined in the claims.

We claim:

1. Apparatus for removing burrs in butt welding of elongated workpieces, comprising a body constructed in the form of a clamp having mating workpiece-engaging jaws, said jaws each having first and second ends, a clamping cylinder coupled to said jaws proximate said first ends, a pair of elongated deburring cutters on each of said jaws proximate said second ends, a common pivot point on each of said jaws, means for mounting an end portion of each cutter of one of said pairs on said common pivot point, and piston and cylinder drive means for pressing said cutters to the workpiece surface in conformity with the shape thereof, said drive means including at least one hydraulic cylinder symmetrically mounted on each of said jaws and having piston rods operatively connected to the respective cutters of each pair to effect pivoting of said cutters about their respective common pivot point.

2. Apparatus as claimed in claim 1, wherein said drive means includes a first hydraulic cylinder secured on one jaw and a second hydraulic cylinder secured on the other jaw a double-arm lever, each said hydraulic cylinder having a piston rod rigidly coupled to the midpoint of said double-arm lever and means pivotally connecting the ends of said lever arms to said corresponding cutters.

3. An apparatus as defined in claim 1, wherein said drive means includes two hydraulic cylinders pivotally secured on each said jaw, each said hydraulic cylinder having a piston rod pivotally connected to one cutter.

* * * * *